United States Patent [19]

Ahrweiler

[11] Patent Number: 4,651,552
[45] Date of Patent: Mar. 24, 1987

[54] ROLL FOR A FOIL-DRAWING CALENDER OR THE LIKE

[75] Inventor: Karl-Heinz Ahrweiler, Willich, Fed. Rep. of Germany

[73] Assignee: Eduard Kusters, Krefeld-Forstwald, Fed. Rep. of Germany

[21] Appl. No.: 637,015

[22] Filed: Aug. 2, 1984

[30] Foreign Application Priority Data

Aug. 16, 1983 [DE] Fed. Rep. of Germany ....... 3329595

[51] Int. Cl.$^4$ ............................................. B21B 29/00
[52] U.S. Cl. ............................... 72/245; 29/113 AD; 29/116 AD; 100/162 B
[58] Field of Search ........................... 72/245, 243, 20; 29/116 AD, 116 R, 113 AD, 113 R; 100/162 B

[56] References Cited

U.S. PATENT DOCUMENTS 3,290,897 12/1966 Kuehn ........................... 29/116 AD
4,429,446 2/1984 Lehmann ....................... 29/116 AD
4,435,971 3/1984 Schuwerk .............................. 72/243
4,440,077 4/1984 Schiel ......................... 29/116 AD X
4,472,958 9/1984 Biondetti .......................... 72/245 X Primary Examiner—R. L. Spruill
Assistant Examiner—Steven B. Katz
Attorney, Agent, or Firm—Kenyon & Kenyon

[57] ABSTRACT

A roll for a foil-drawing calender or the like which is substantially solid, has a central longitudinal bore hole and has journals supported in outer bearings in a roll stand. In the longitudinal bore hole is a stationary core which is supported, at axial locations corresponding to the ends of the working width, via inner bearings in the longitudinal bore hole and is braced via a hydraulic force-exerting arrangement acting in the working plane of the roll in a direction toward the roll gap and against the inside circumference of the longitudinal bore hole. In the vicinity of the inner bearings and in the region of the outer bearings, load-relieving hydraulic force-exerting arrangements are provided which brace the core against the inside circumference of the longitudinal bore hole and act in the action plane of the roll in the direction opposed to that of the other hydraulic force-exerting arrangement.

4 Claims, 4 Drawing Figures

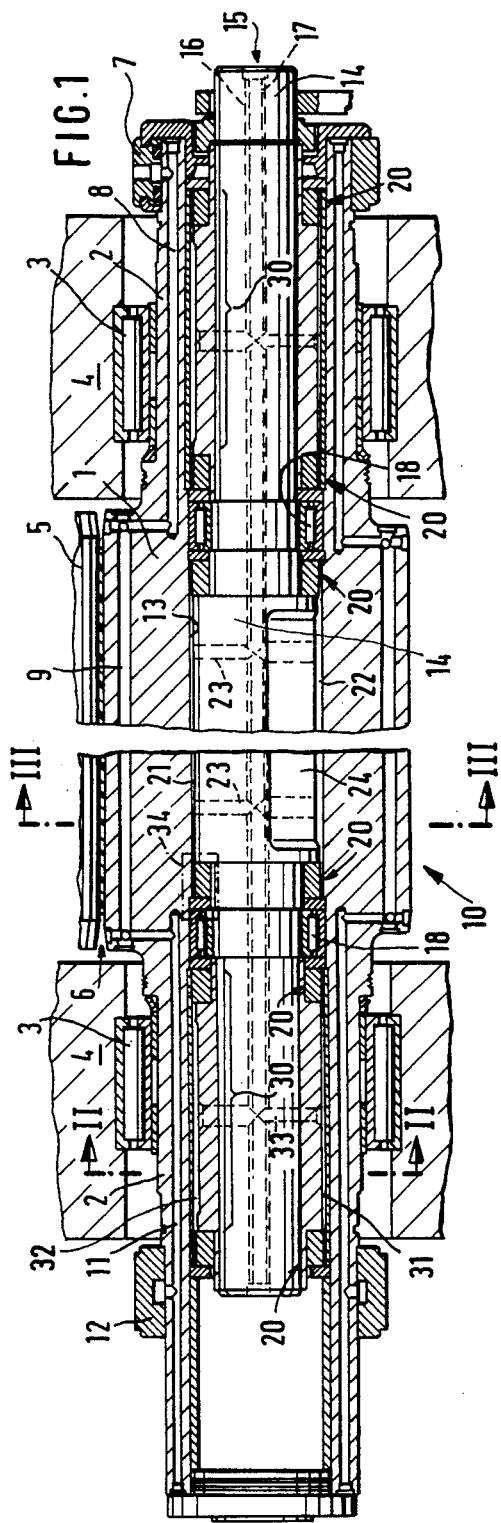
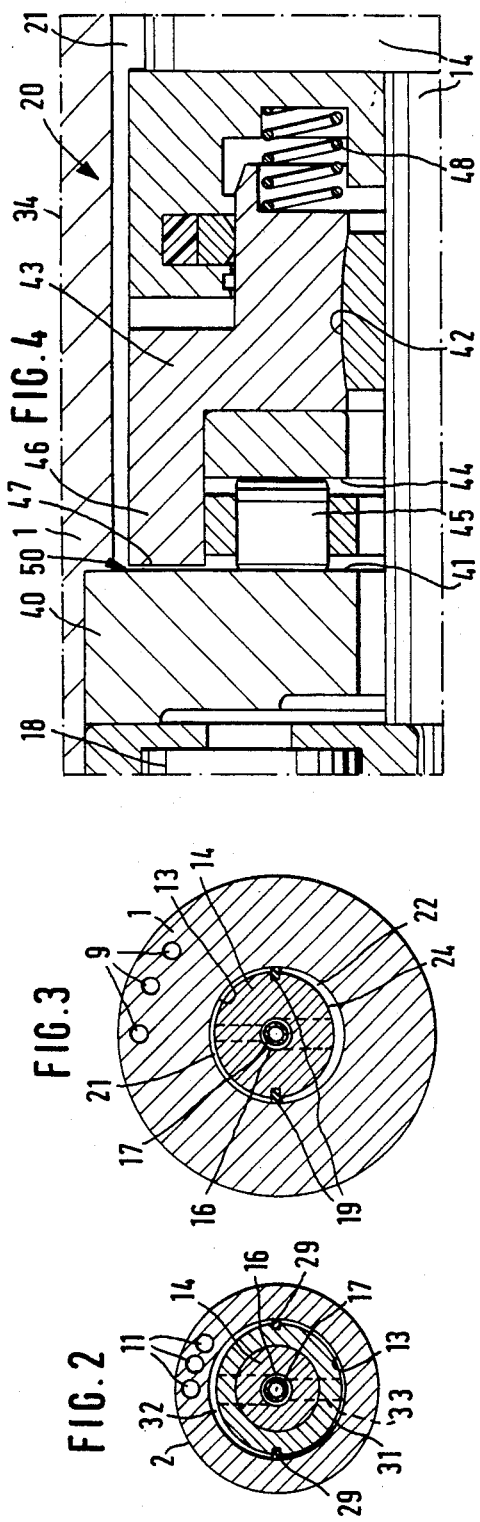

ROLL FOR A FOIL-DRAWING CALENDER OR THE LIKE

BACKGROUND OF THE INVENTION

This invention relates to a roll for a foil-drawing calender or the like of the type which is substantially solid and has a central longitudinal bore hole, is supported in journals at its ends and has associated devices for compensating deflection caused by the line pressure.

Known rolls of this type have an outside diameter of about 700 mm and a diameter of the central longitudinal bore hole of about 200 mm. If the roll has been manufactured by centrifuging, this longitudinal bore hole depends on the fabrication. In the finished roll it can be used to conduct a fluid heating or cooling medium through the roll.

The term "substantially solid" indicates the considerable remaining wall thickness of the roll body of about 250 mm. The wall thickness is so large that the loss of bending resistance moment due to the longitudinal bore hole as compared with a completely solid roll is not more than 10%.

The practically complete solidness is an integral feature of a roll intended for a foil-drawing calender or similar applications, since such a roll must be capable of calibration, i.e., it must be capable, due to its dimensional stiffness, of equalizing local differences in the thickness or the compressibility of the plastic compound offered and discharging from the roll gap a foil which has a thickness as constant as possible over the width of its web.

The line pressures required in the rolling of plastic foil are very considerable. Thus, line pressures on the order of magnitude of 3700 N/cm are required for rolling low-pressure PVC (polyvinylchloride) and even 6300 N/cm for rolling high-pressure PVC. In spite of the quasi-solidity of the rolls and in spite of the relatively large diameter with the customary working widths of 2 m, such line pressures already lead to deflections of the roll as a whole, which, without special measures, would lead to unpermissible tolerances of the foil thickness at the edges and in the center of the web.

A further integral feature of the known foil-drawing calender is therefore the use of devices for compensating this deflection caused by the line pressure. These devices are very expensive because of the dimensional stiffness of the rolls and the occurrence of high line pressures. Three different measures are taken side by side throughout, namely, what is called roll bending, i.e., the introduction of bending forces which counteract the deflection caused by the line pressure; a bombage, i.e., slight diameter differences along the roll produced by grinding the shape of the roll accordingly; and an oblique adjustment of rolls relative to each other, so that the roll axes of an interacting pair of rolls do not lie in the same plane but the one roll is, in the form of a very steep screw, so to speak, placed around the other roll. The design and structural expense which is necessary to accommodate all three measures in one and the same machine, is obvious.

In spite of this considerable expense, it is not possible today at that to run a large range of line pressures with one and the same machine. Differently designed machines are required for processing softer plastics and for processing harder plastics.

It is an object of the present invention to provide a simpler compensating system for the deflections caused by the line pressure, usable over a larger range of line pressures while retaining the solidity or dimensional stiffness of the roll.

SUMMARY OF THE INVENTION

According to the present invention, this problem is solved by a stationary core arranged in the longitudinal bore hole, inner bearings supporting the core in the longitudinal bore hole at axial locations corresponding to the ends of the working width, and a hydraulic force exerting arrangement which acts in the working plane of the roll in a direction toward the roll gap and against the inside circumference of the longitudinal bore hole.

The roll of the foil-drawing calender is, in practice, designed as a deflection-controller roll. The indispensable solidity of the rolls, which up to now had to be used for foil drawing and similar applications, has been an obstacle to this idea since it seemed that a stationary core could not be accommodated without giving up the solid construction. It has been found, however, that it is indeed possible to accommodate a stationary core in the roll without appreciably jeopardizing the solidity and without substantial reduction of the bending resistance moment. This is related to the fact that the core zones hardly contribute to the bending resistance moment. Thus, it is found that if the longitudinal bore hole of 200 mm already present in the conventional rolls with a diameter of 700 mm is drilled up to 300 mm, a loss of the bending resistance moment of only about 2.7% occurs. With a core having a diameter of somewhat less than 300 mm, the necessary counter-bending forces can readily be supplied with a working width of about 2 m.

The present invention got its start from problems which arise in foil-drawing calenders and is primarily intended for this purpose. It is understood, however, that the present invention is also suited for other applications in which a similar problem occurs, for instance, in rolling mills for rolling aluminum foil. There, too, the important point is the capability of calibration, using the high dimensional stiffness of the roll body.

Any pertinent known embodiment can be considered as a "force exertion arrangement." Thus, the space between the core and the inside circumference of the longitudinal bore hole, for instance, can be subdivided by lengthwise and transverse end seals into longitudinal chambers which can be filled with a hydraulic pressure liquid at least on the side facing the rolling gap (German Pat. No. 14 11 327). This design is preferred because, in this way, the largest effective area of the hydraulic pressure is obtained and this pressure can thereby be kept within limits. In addition, only recesses for the liquid feed lines need to be provided in the core, so that its cross section and thereby its bending strength are substantially preserved.

However, it is also possible to arrange, on the action side, in a longitudinal section of the core, a strip-shaped piston which extends over the length of the core and which is acted upon from the interior of the core by pressure liquid and rests via a pressure shoe against the inside circumference of the longitudinal bore hole, gliding on a film of liquid (German Pat. No. 14 61 066).

Also, a design according to DE-OS No. 22 30 139 should be considered, in which individual support plungers are provided which are distributed over the length of the core and are designed as hydraulic piston/cylinder units and have, on the side facing the inside circumference of the longitudinal bore hole, hydrostatic pressure chambers, by means of which they are braced quasi-hydrostatically against the inside circumference via the liquid.

Finally, combined designs are also usable such as are described in German Pat. No. 30 03 395.

As required by its function, the core must be supported at the ends at the inside circumference of the longitudinal bore hole, if it is to supply the forces which counteract the deflection caused by the line pressure. While purely theoretically, the support can also be arranged in the manner described in German Pat. No. 23 25 721, i.e., without bearings and only by hydraulic support plungers or the like operating in different directions in the action plane, in practice only embodiments in which inner bearings are provided at the ends of the working width should be considered, especially for reasons of properly guiding the core relative to the roll.

Without further measures, these bearings must intercept very considerable forces which are on the order of the total forces generated by the line pressure, i.e., with a line pressure of 6000 N/cm and 2 m working width, in the range of 1200 kN, or about 600 kN per bearing. The two bearings are, therefore, very highly stressed, and it is a further problem that only a diameter corresponding to the diameter of the longitudinal bore hole is available for the bearings, which cannot be exceeded for design reasons. To this is added that the operating speed can be quite considerable and may be entirely in the range of about 100 m/min. The outside diameters obtained for a given bearing load and a given speed in antifriction bearings are pretty well fixed and, in the present case, are considerably larger than the available diameter of the longitudinal bore hole.

A further problem thus arises to design such a roll so that it is permanently operable with bearings which can be accommodated in the limited diameter of the longitudinal bore hole.

The solution of this further problem resides in disposing, in the vicinity of the inner bearings, load-relieving hydraulic force-exertion arrangements supporting the core at the inside circumference of the longitudinal bore hole and acting in the acting plane of the roll in a direction opposite to the said first hydraulic force-exerting arrangements.

The additional hydraulic force-exerting devices in the vicinity of the inner bearings intercept at least a considerable part of the radial forces occuring during operation and acting, in the acting plane, on the inner bearings, so that the bearings need transmit only accordingly smaller forces and, at best, are even practically load-relieved and have only guidance purposes.

The load-relieving hydraulic force-exerting arrangements may comprise any design which also has a hydraulic force-exerting arrangement acting between the bearings against the rolling gap. Both may be identical or also different if this is desirable for design reasons. An important further feature resides in bearing relief in which the core protrudes beyond the inner bearings as seen in the longitudinal direction of the roll, into the region of the outer bearings, and the load-relieving second hydraulic force-exerting arrangements engage at that axial location.

Through this arrangement it is possible to accomplish load-relief of the inner bearings without thereby exerting an additional bending moment on the outer roll body as would be the case if the load-relieving forces were introduced into the outer roll body at a point located, in the axial direction, outside the outer bearings. This effect is positively utilized in German Pat. No. 30 03 396 to influence to bending line of an outer hollow roll.

A roll with a stationary core, in which the outer roll body is supported in its roll journals in the roll housing, is known per se from U.S. Pat. No. 3,703,862. This, however, does not involve a "substantially solid roll", but the outer roll body is relatively thin-walled, so that enough room is available for the inner bearings and the corresponding problems of the roll according to the present invention do not apply.

The present invention also covers a foil-drawing calender or the like which is equipped with at least one of the above-described rolls. Such a calender is characterized by the feature that none of the measures known up to now such as measures for deflection compensation like roll bending, bombage or oblique adjustment are provided, but the required properties are provided only by the shape of the rolls themselves.

BRIEF DESCRIPTION OF THE DRAWINGS

FIG. 1 is a longitudinal section through a roll according to the present invention.

FIG. 2 is a cross section taken along the line II—II in FIG. 1.

FIG. 3 is a cross section along the line III—III in FIG. 1.

FIG. 4 is an enlarged seal detail of the portion framed in FIG. 1 by dashed lines.

DETAILED DESCRIPTION

The roll 10 in FIG. 1 comprises a roll body 1 as well as two roll journals 2 integral therewith, at which the roll is rotatably supported via outer antifriction bearings 3 in a rolling stand 4 not detailed. The roll body 1 cooperates with a counter-roll 5, forming a rolling gap 6. The width of the roll body 1 is selected in accordance with the width of the foil web to be processed.

The roll 10 has, at the end situated at the right, outside the roll stand 4, a stationary feed ring 7 for a fluid temperature medium, for instance, hot water at 220° C. and 32 bar. The feed ring is in communication with axial feed lines 8, distributed over the circumference, in the roll journal 2 to the right in FIG. 1, which are connected via short radial lines to axial heating canals 9 in the roll body 1. At the left end of the heating canals 9, short radial canals lead to axial discharge lines 11 in the left-hand roll journal 2 which are connected to a stationary discharge ring 12, through which the temperature medium is drained from the roll again. The temperature medium can, of course, also have a low temperature in certain cases and serve for cooling the roll 10.

The roll 10 has a central lengthwise through bore hole 13, the diameter of which is small as compared to the outside diameter of the roll body 1, so that the wall thickness of the roll body 1 remains comparable with the diameter of the longitudinal bore hole 13. The roll body 1 can therefore be considered as substantially solid. It has considable dimensional stiffness which permits equalization of pressure differences occurring locally in the roll gap 6 without appreciable local deformation of the roll body 1. With an outside diameter of the roll body 1 of about 700 mm, the diameter of the longitudinal bore hole 13 is about 300 mm, so that a wall thickness of 200 mm still remains.

In the longitudinal bore hole 13, a non-rotatable core 14 is arranged, the diameter of which, in the region of the roll body 1, is only a few millimeters smaller than that of the longitudinal bore 13 which ends in the region of the left roll journal 2 inside thereof and which protrudes from the right roll journal 2 and has there a connection 15 for a double line which consists of a pipeline 17 arranged in a longitudinal bore hole 16 with internal spacing.

In the vicinity of the ends of the roll body 1, the roll body 1 is rotatably supported on the core via antifriction bearings 18 arranged between the inside circumference of the longitudinal bore 13 and the core 14. As seen in the axial direction, between the bearings 18, two oppositely arranged longitudinal seals 19 (FIG. 3) are arranged at half height, i.e., at its widest point, which rest against the inside circumference of the longitudinal bore hole 13 and, in conjunction with transverse end seals designated as, a whole by 20, which are immediately adjacent to the bearings 18, separate the space between the core 14 and the inside circumference of the longitudinal bore 13, into a longitudinal chamber 21 located on the side of the roll gap 6 and a longitudinal chamber 22 located on the opposite side.

Through the pipeline 17 in the longitudinal bore hole 16 of the core 14, pressure liquid is fed in. This liquid arrives via branch lines 23 at the chamber 21. Due to the pressure produced in the chamber 21, the roll body 1 is subjected to a pressure which is directed against the roll gap 6 and remains constant over the lengthwise extent of the longitudinal chamber 21 and thereby practically over the length of the roll body 1. This pressure counteracts the pressure caused by the line pressure and the deflections otherwise generated thereby.

The force exerted by the pressure liquid against the inside circumference of the longitudinal hole 13 naturally requires a counter force which is furnished by the deflection of the core 14 between the bearings 18. So that the core 14 does not touch the inside circumference of the longitudinal hole 13 due to the deflection which, according to FIG. 1 is downward, the core 14 is formed eccentrically in this region, as can be seen at 24, so that a somewhat larger spacing from the inside circumference of the longitudinal bore hole 13 is provided.

In order to counteract the deflection of the roll body 1 downward according to FIG. 1, the forces which must be exerted in the chamber 21 for practical purposes correspond to the total forces exerted by the line pressure on the roll 10. These forces are too large for the bearings 18, since they can have no larger outside diameter than can be accommodated in the longitudinal bore hole 13.

Since the bearings 18 are stressed by forces which attempt to push the core 14, according to FIG. 1, downward, a load relief device is provided which engages at the end regions of the core 14 located outside the bearings 18 within the roll journals 2 and within the outer bearings, and pushes the latter upward.

As may be seen from FIG. 2, there are again provided in this region, longitudinal seals 29 which are arranged at the core at about half height thereof, i.e., at its widest point, rest against the inside circumference of the longitudinal bore 13 with a seal and extend all the way to the transverse end seals 20 (FIG. 1), which are located at the ends of a region 30 (FIG. 1). In the region 30, a longitudinal chamber 31 is divided off by the longitudinal seals 29 on the side facing away from the rolling gap 6, while a longitudinal chamber 32 is situated on the opposite side. The longitudinal chamber 31 is in communication via a branch line 33 with the pipeline 17 for supplying the hydraulic pressure medium. If hydraulic pressure medium is supplied to the chamber 31, the core is subjected to a force which, according to FIG. 1, is directed from the bottom up, is opposed in the vicinity of the roll body 1 to the force exerted on the core 14 and thus load-relieves the bearings 18.

The hydraulic pressure medium supplied to the longitudinal chambers 21 and/or 31 can likewise be cooled or heated in order to enhance the effect of the fluid temperature medium conducted through the heating canals 9.

Any pressure liquid which might pass the longitudinal seals 19 and 29 gets into the chambers 22 and 23 is discharged from there via branch lines and via the space between the inside circumference of the longitudinal hole 16 and the outside circumference 17. The chambers 22 and 23 can also be kept at a predetermined counterpressure, so that a definite resultant pressure determined by the pressure difference acts on the roll body 1.

In the illustrated embodiment the longitudinal chambers 21 and 31 are connected to the same pipe line 17 and therefore carry the same pressure. However, it is also possible to provide a separate pressure supply for the longitudinal chambers 31. Also, if the two longitudinal chambers 31 together are smaller than the longitudinal chamber 21, a far-reaching relief of the bearings 18 can be obtained in this manner by setting a higher pressure in the longitudinal chambers 31.

It is important that the regions 30 or the longitudinal chambers 31 are disposed at the same axial position as the outer bearings 3 because, thereby, the pressure exerted in the longitudinal chambers 31 has no influence on the bending line of the roll body 1.

The transverse end seals 20 are shown only as rectangles in FIG. 1. In FIG. 4, the dash-dotted region designated as 34 in FIG. 1 is shown in detail. The transverse end seal 20 comprises a ring 40 which revolves with the roll body 1 and rests against the inner bearing 18 with a running surface 41 as well as an intermediate ring 43 which is supported on the core 14 via a spherical surface 42 and is movable along the spherical surface 42, with a bearing surface 44 which extends, like the support surface 41, perpendicular to the axis and is arranged opposite surface 41 with spacing. The intermediate ring 43 is connected to the core 14 and accordingly is standing still. Between the revolving bearing surface 41 and the stationary bearing surface 44, a bearing ring with cylindrical bearing rolls 45 is arranged. Bearing rolls 45 hold the intermediate ring 43 at an exact distance from the bearing ring 40. The bearing ring 43 has an external cylindrical extension 46, whose end face 47 is arranged opposite the bearing surface 41 with a spacing of only a few hundredths of a millimeter. This spacing is maintained exactly by the bearing rolls 45. The intermediate ring 43 is pressed against the rolls 45 by axial compression springs 48. The compression springs 48 are braced against the core 14.

The choke effect of the gap 50 between the bearing surface 41 and the end face 47 of the intermediate ring 43 is so strong that only small amounts of pressure liquid pass even at a pressure in the longitudinal chamber 21 of 30 bar or more and the the pressure in the longitudinal chamber 21 can be maintained without difficulty. Even if the core 14 is bent, the intermediate ring 43, which can shift relative to the core 14, maintains its position relative to the bearing ring 40, so that the gap 50 is always maintained in the same manner.

The transverse end seal 20 works without making contact and practically without wear and permits the maintenance of the high pressures in the longitudinal chamber 21 which are required for the operation of the roll 10.

What is claimed is:

1. In a roll for a foil-drawing calendar or a rolling mill which roll is substantially solid, has a central longitudinal bore hole and is supported by journals adapted to be received in outer bearings in a roll stand, for cooperation with a further roll by forming a roll gap therewith, said roll having a working width over which it can apply a force in a working plane passing through the roll gap, the improvement comprising:

a stationary core arrangement in the longitudinal bore hole, inner bearings supporting said core in the longitudinal bore hole at axial locations corresponding to the ends of the working width; a first hydraulic force exerting arrangement which acts in the working plane of the roll in a direction toward the roll gap and against the inside circumference of the longitudinal bore hole; and in a vicinity of the inner bearings, loadrelieving second hydraulic force exerting arrangements supporting the core at the inside circumference of the longitudinal bore hole and acting in the working plane of the roll in a direction opposite to said first hydraulic force-exerting arrangement.

2. A roll according to claim 1, wherein said core protrudes beyond the inner bearings as seen in the longitudinal direction of the roll, into the region of said journals, and said load-retrieving second hydraulic force-exerting arrangements engage at the axial locations of said journals.

3. A roll according to claim 1 and further including, in combination therewith a further roll forming with said roll a foil-drawing calendar.

4. A roll according to claim 2 and further including, in combination therewith a further roll forming with said roll a foil-drawing calendar.

* * * * *